Jan. 31, 1950     F. R. FRANCIS     2,495,927
LATHE MACHINE
Filed Oct. 6, 1943     6 Sheets-Sheet 1
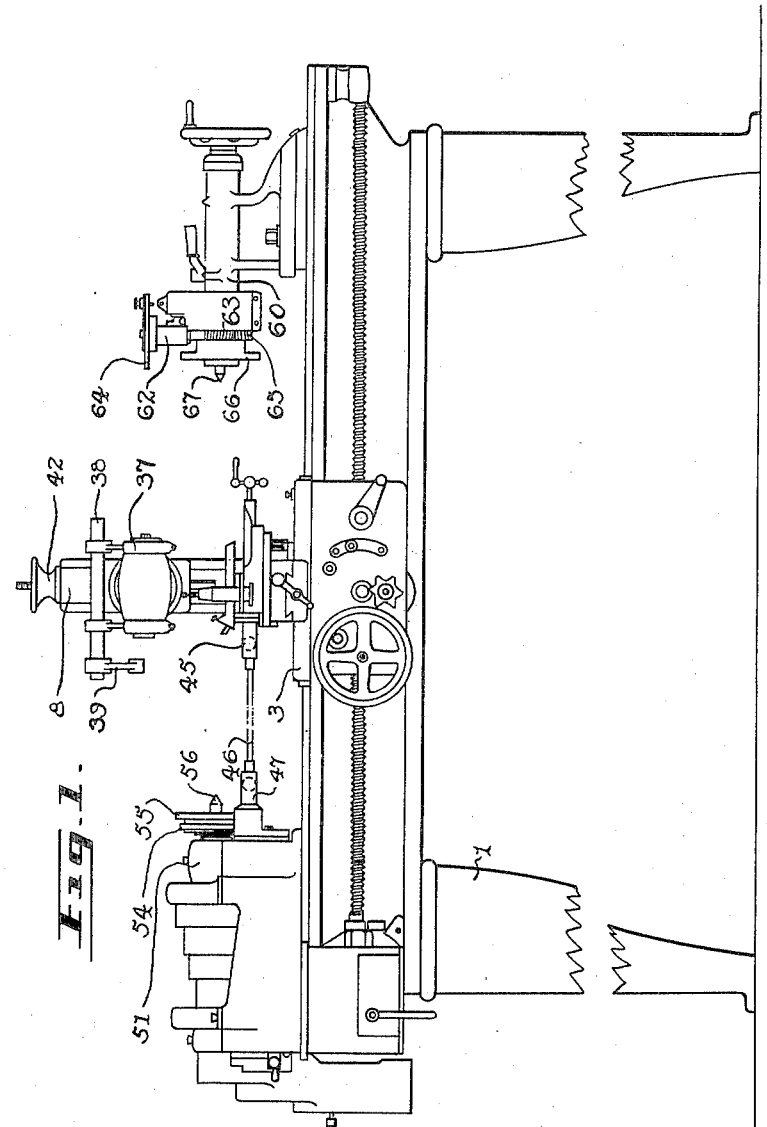
Inventor
FREDERICK R. FRANCIS
By W. Jarvis Haskett
Attorney.

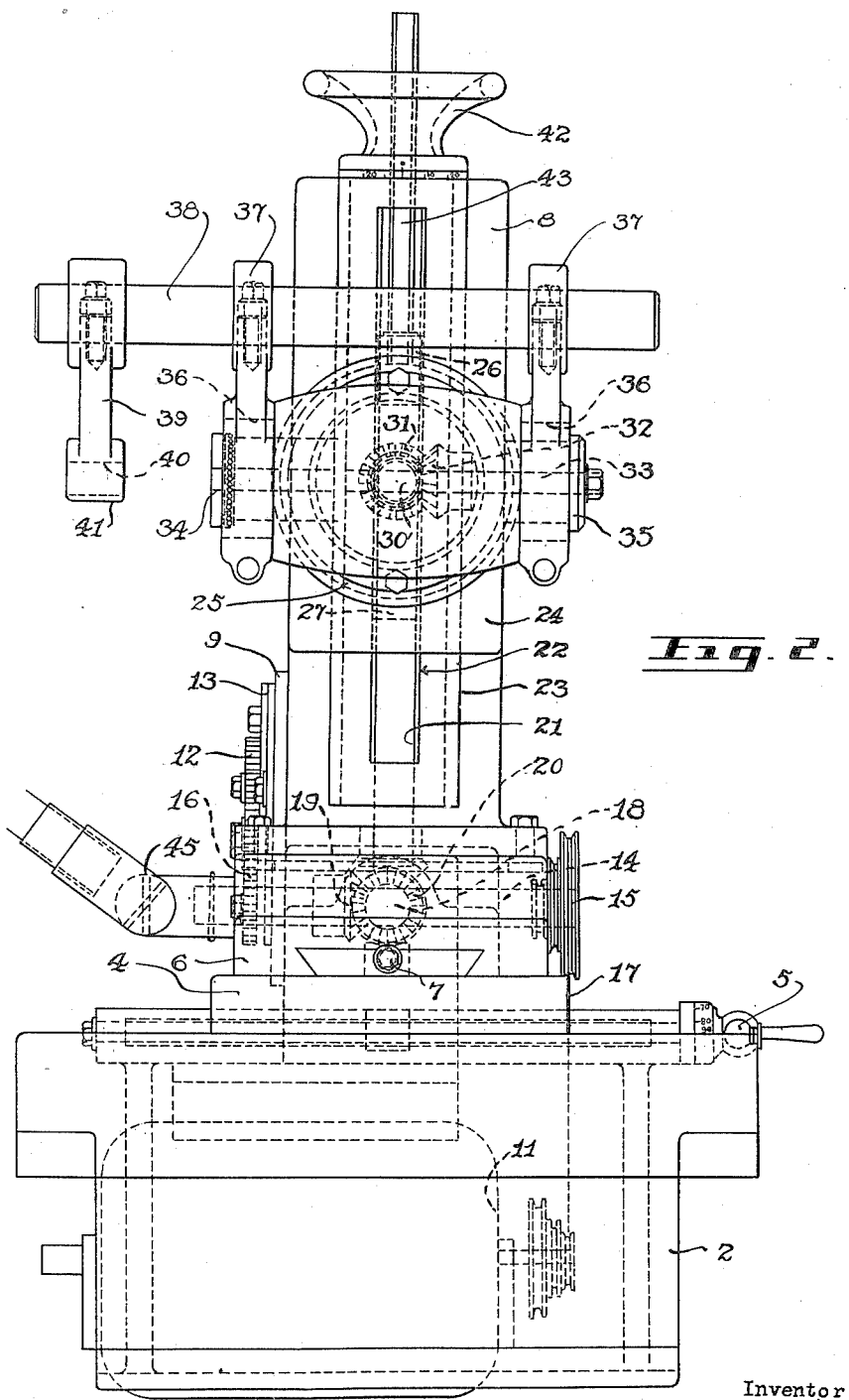

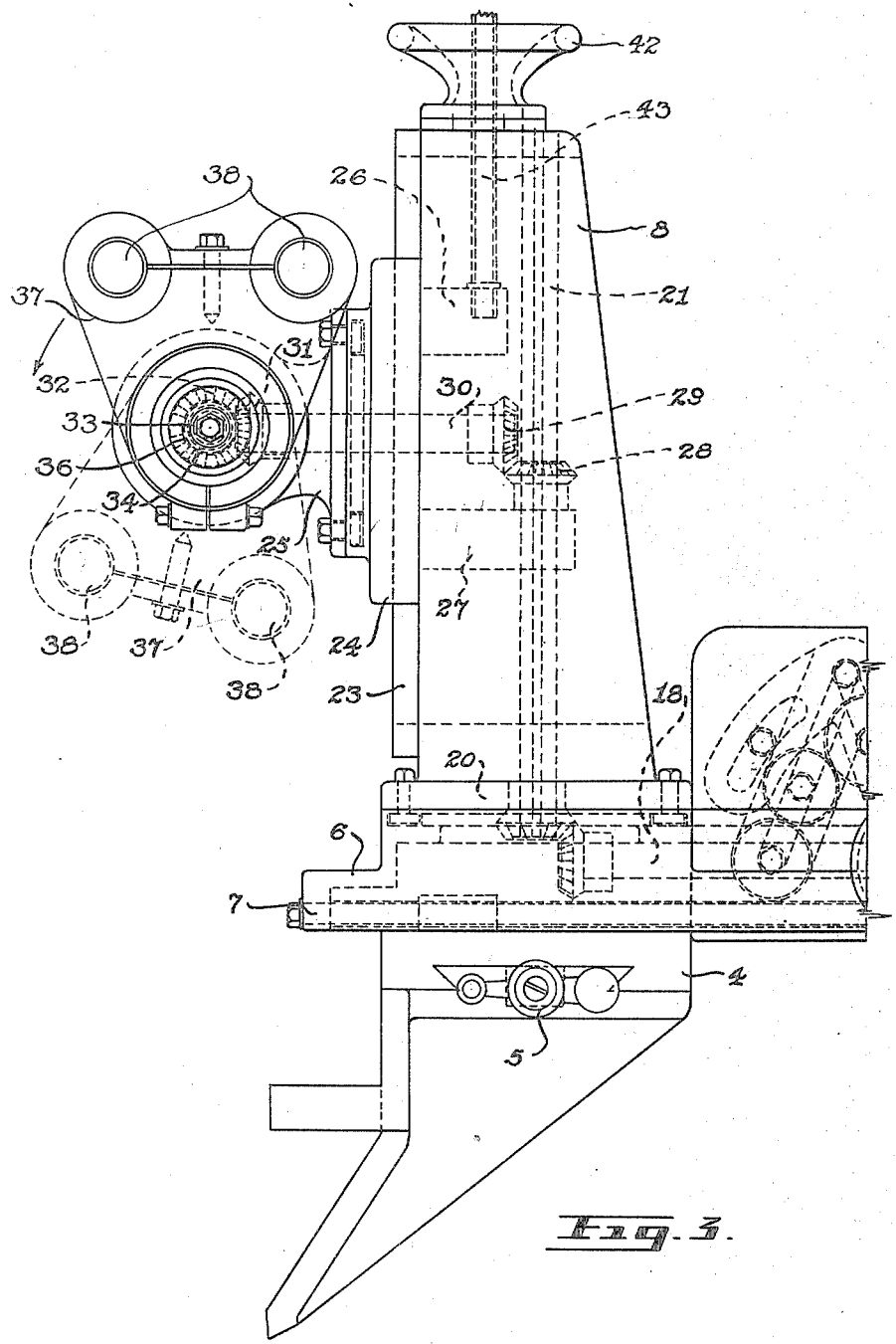

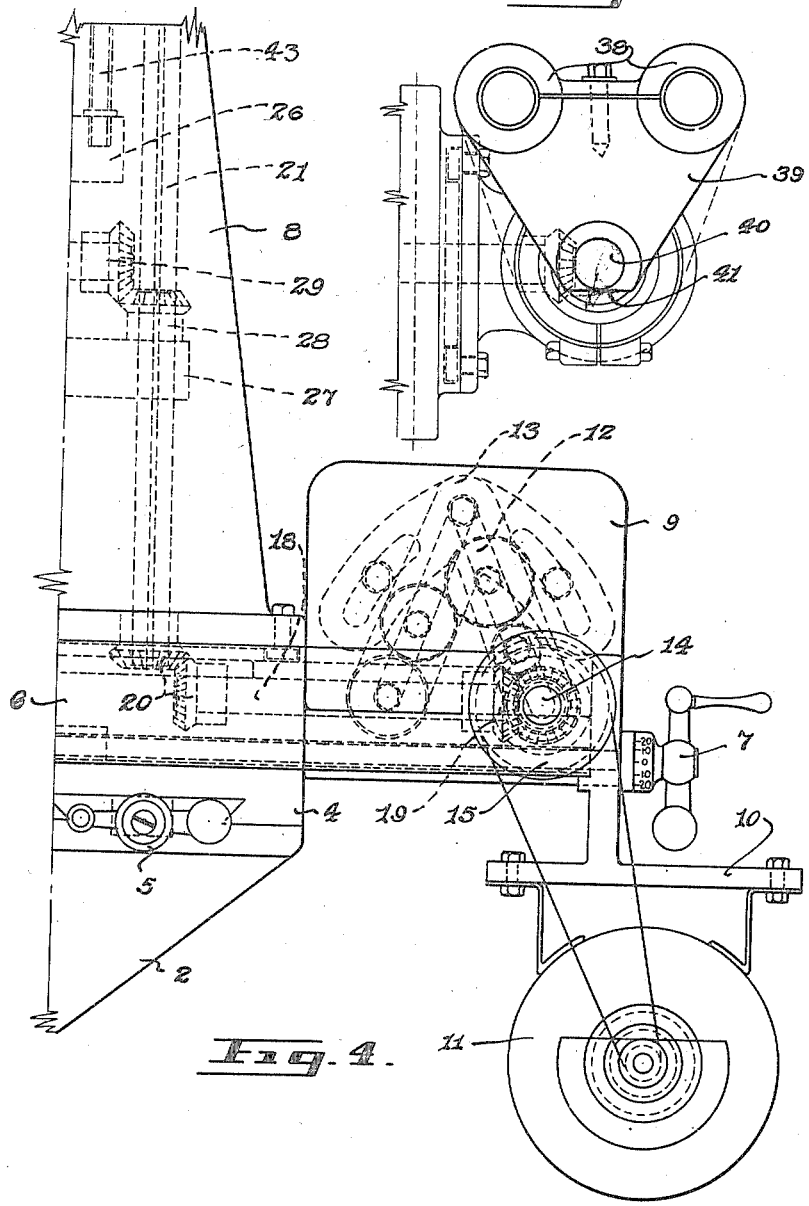

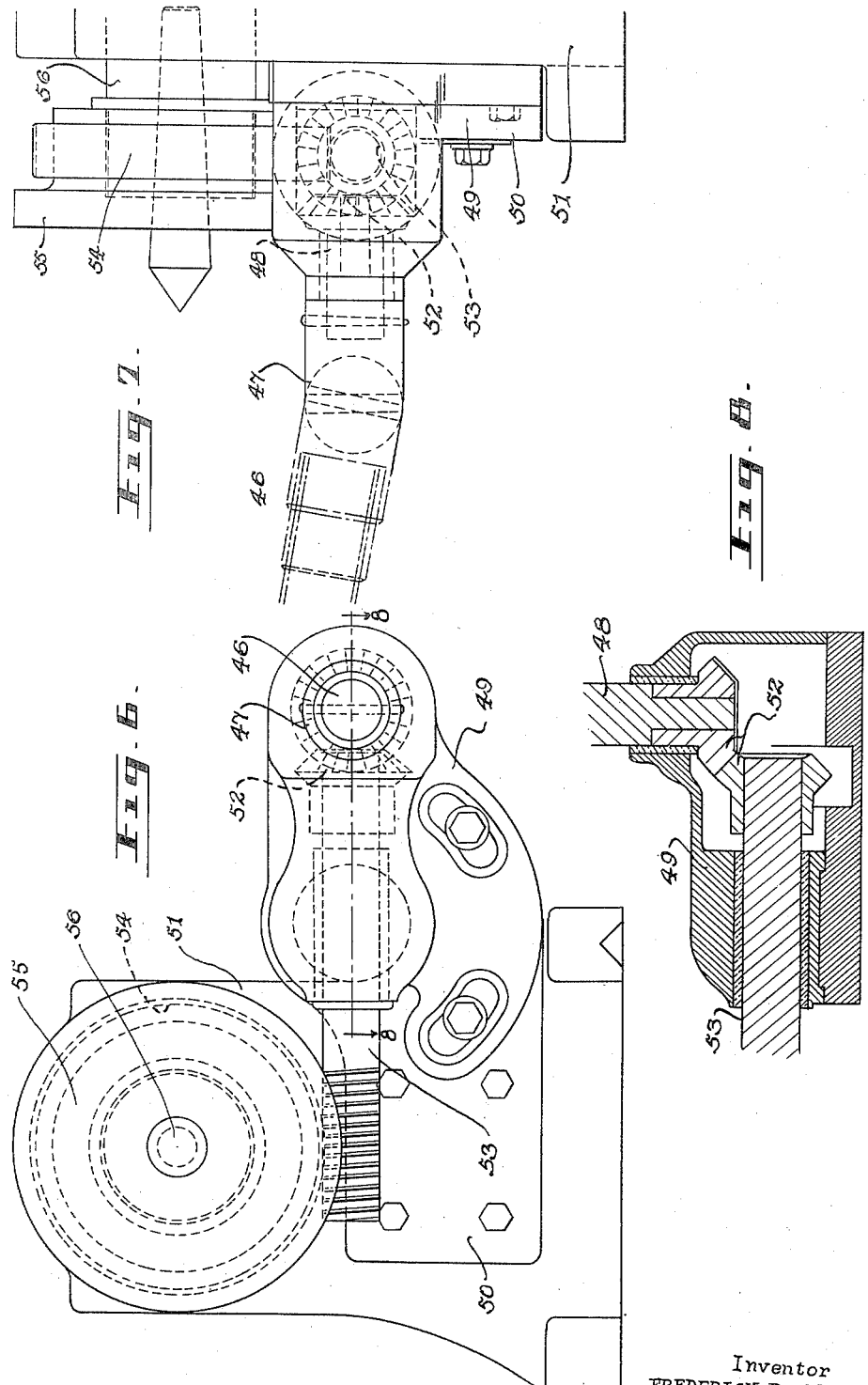

Jan. 31, 1950  F. R. FRANCIS  2,495,927
LATHE MACHINE
Filed Oct. 6, 1943  6 Sheets-Sheet 6
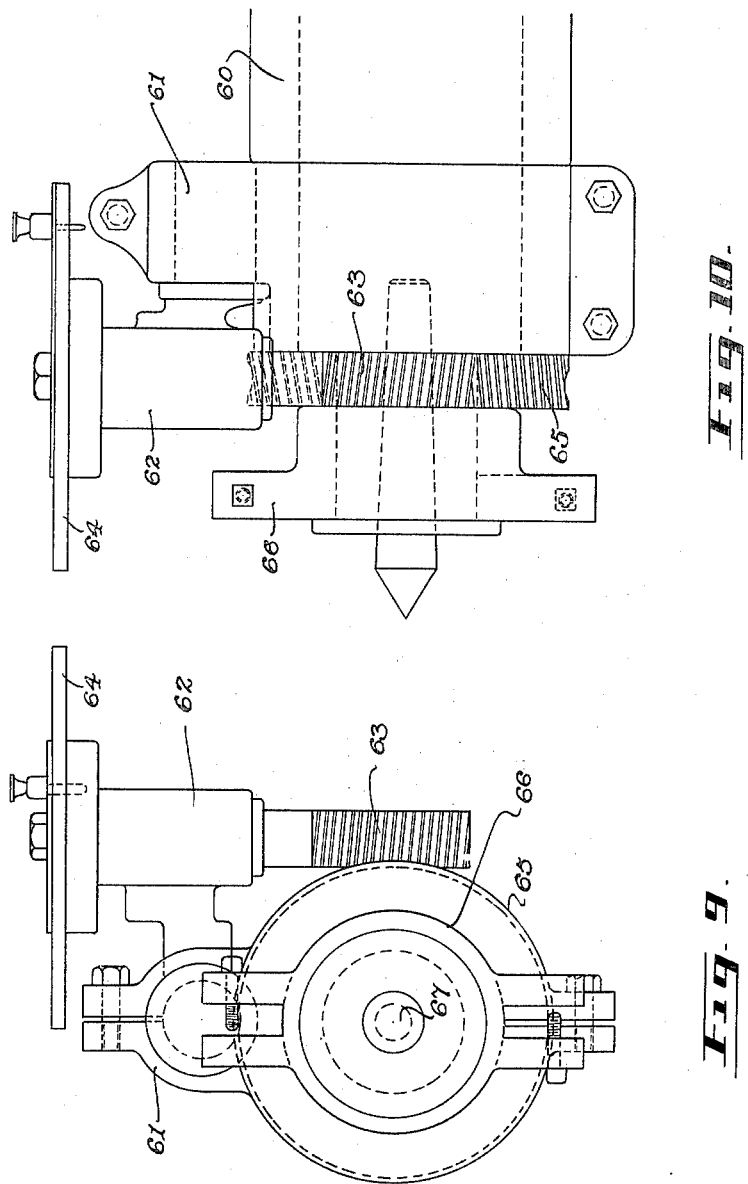
Inventor
FREDERICK R. FRANCIS
By [signature]
Attorney.

Patented Jan. 31, 1950

2,495,927

UNITED STATES PATENT OFFICE 2,495,927

LATHE MACHINE

Frederick R. Francis, Billings Bridge, Ontario, Canada

Application October 6, 1943, Serial No. 505,245
In Canada July 24, 1943

4 Claims. (Cl. 90—11)

My present invention relates to improvements in a universal miller and appertains particularly to an attachment for the conventional lathe, whereby the same may be enabled to perform any and all operations now capable of being done only on various kinds of milling machines, such as gear hobbing, high lead threads, worm shafts, etc.

The principal object of the invention is to provide a gear cutting and hobbing attachment for a lathe comprising a motor driven tool head mounted on the lathe saddle and geared to the head stock spindle of the lathe so that the two rotatable parts, viz. the tool head and spindle, are synchronized and may be driven in any desired gear ratio.

A further object of the invention is to provide a milling attachment for use on a lathe for cutting high lead screws and the like, wherein the cutters in the tool head may be set at any angle whereby straight or helical grooves may be cut as the blank between the spindles rotated through a synchronized speed-reducing gear train from the tool head, and the saddle carrying the tool head transversed by the lathe lead screw, which latter is operated back through the usual gear box from the spindle.

A further object of the invention is to provide an attachment for a lathe whereby the same becomes a universal milling machine capable of performing innumerable operations whose accomplishment hitherto required the use of several specialized milling machines, thereby enabling a small machine shop, garage or the like with a single lathe and this attachment to turn out complete almost any mechanical part or piece encountered in machine shop, tool room, or garage.

A still further object of the invention is the provision of a universal milling attachment for a lathe of the nature and for the purpose set forth that is characterized by structural simplicity, durability, ease of installation and operation and that being capable of manufacture at reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a front elevation of a conventional lathe, on the saddle of which my attachment is mounted;

Figure 2 is a front elevation of the attachment;

Figures 3 and 4 are overlapping, complementary side elevations thereof;

Figure 5 is an elevational detail of the arbor support, as seen from the opposite side;

Figures 6 and 7 are elevations at right angles to each other of my head stock spindle with synchronized speed drive from the universal attachment;

Figure 8 is a sectional detail of the mitre gears drive therefor as taken on line 8—8 of Figure 6; and Figures 9 and 10 are elevations, at right angles to each other, of the indexing head for the tail stock.

The attachment connects to a lathe 1 by means of a main supporting bracket 2 that fits against and fastens to four machined surfaces regularly found on the back of the saddle 3. This bracket extends rearwardly and carries a horizontal, longitudinal feed slide 4, operable by a hand screw 5 and surmounting it a cross feed slide 6, likewise operable by a hand screw 7.

The main column 8 rests on the cross feed slide 6, behind and to one side of which cross feed slide is a gear train supporting bracket 9 and suspended from the rear of the slide is a motor support bracket 10 with a motor 11 slung thereunder. An interchangeable gear train 12 with adjustable bracket supports 13 is carried by the bracket 9 and keyed on opposite ends of the main drive shaft 14, extending through the rear of the cross feed slide 6, are the pulley wheel 15 and gear wheel 16, the former connected by a belt 17 with the motor 11 and the latter meshing with the gear train 12.

Approximately midway of the main drive shaft 14, a horizontal cross drive shaft 18 gears thereto by a pair of mitres 19 and in turn connects by another pair of mitre gears 20 with the vertical drive shaft 21 that rises to the top of the column 8.

A slot 22 with dove tail flange 23 on either side occurs up the front face of the column 8 for the graduated tool head slide 24 that carries a tool head 25. A pair of vertically spaced bosses 26 and 27 extend from the slide 24 in through the slot 22, the latter boss 27 being apertured to pass the column drive shaft 21 and support on its upper surface a sliding, keyed, bevel gear 28 that meshes with another bevel gear 29 on the arbor drive shaft 30 which in turn has a bevel gear 31 on its outer end, about the centre of the tool head 25, that meshes with a bevel 32 on the arbor shaft 33. The left hand of this shaft terminates beyond the tool head 25 in a tapered arbor 34 and the right hand end, beyond the tool head with a nut-confined washer 35 while at both ends on concentric necks 36 extended from the tool head 25 are journalled spaced swivel supports 37 for a pair of parallel shafts 38 that project to the left to carry an arbor support 39 whose bore 40 is coaxial with the tapered arbor 34 and whose lower end is finished off flat, as at 41, close up to the bore to reduce the needed clearance of this arbor support to a minimum.

Ability of the arbor support to swing through 180°, as shown in dotted line in Figure 3, enables the same to support working tools from below or at any desired position in this 180° arc.

The vertical adjustment of the tool head slide 24 is by means of a hand wheel 42 surmounting the column 8 and a vertical feed screw 43 anchored in the upper tool head slide boss 26.

A drive connection between the tool head of my attachment and the head stock spindle of the lathe, so that they may be synchronized and rotated in any desired ratio, is provided in this wise:

To the shaft of the end gear of the selected gear train 12, a universal joint 45 is keyed and from this a telescopic or sliding sleeve shaft 46, with another universal joint 47 on its far end, connects with a stub shaft 48 in a housing bracket 49 adjustable on the mounting plate 50 on the head stock 51 of the lathe 1. A pair of bevel gears 52 in the housing bracket 49 connect the stub shaft 48 with a worm shaft 53 that meshes with a worm gear 54 on the plate 55 of the head stock spindle 56. Thus the spindle may be turned at a reduced speed, of say 1-40 for feed of work or other purposes.

An indexing attachment or dividing head, attached to the tail stock is used for making any needed divisions on blanks held between lathe centres, as for instance in cutting spur gears. Here I mount a main indexing head casting 61 on the tail stock spindle 60 and through a forwardly continuing, vertically bored casting 62 adjustably held thereby, passes a worm shaft 63 whose upper end carries a rotatable index plate 64. The shaft itself meshes with a worm gear 65 attached to the driving plate 66 of this tail stock spindle 60. Alternatively this indexing attachment may be mounted on the head stock spindle 56, when so desired.

The wide adaptability of this attachment rendering the same, in effect, a universal milling machine will be clearly seen from the comprehensive summary of some of the more important and unusual work that can be performed on a lathe equipped with my lathe machine, viz:

*Worm and screw cutting.*—In screw cutting, where a high lead is required, the tool head of this lathe machine can be set at any helix angle and the revolving cutter operated in conjunction with a suitable reduction gear. The lathe spindle speed reduced thereby makes possible the cutting of any and all leads, either on chucked or between centre work.

*Thread milling.*—Chuck or spindle held work, where the cutting of a large number of internal or external threads is required, can be improved by lathe machine in that the tool head, with thread milling hob as cutter and spindle of lathe driven by reduction gear which is synchronized with tool head spindle, makes possible increased speed and even higher quality of product than on specialized thread milling machines.

*Gear cutting and generated hobbing.*—In spur gear cutting, blanks on mandrel between lathe centres, with lathe machine index head attached to tailstock spindle, make any division of blank possible, and by using cutter in tool head, any tooth or irregular shape as in fluting reamers or milling cutters, can be done, or by setting tool head at any helix angle worm gears may be cut. In this operation, by using the reduction gear to drive lathe spindle, same being synchronized with spindle of tool head, one is enabled to cut spiral spur gears, while another highly important operation that can be done by lathe machine with this attachment is the cutting of gears by generated hobbing.

*Horizontal boring.*—In the case of boring irregular or hard to swing pieces of work, the same can be handled on lathe machine by removing compound rest from lathe and replacing with working table on which can be secured part to be produced, and work of boring, milling or drilling accomplished, in most cases, without the necessity of "laying out" as in using the tool head of lathe machine to do these operations graduated feeds in all direction are provided.

The above facilities are also available from tool head of lathe machine to operate at any position or angle on work held in chuck or face plate, at the same setting for any lathe turning operation, thereby assuring the squareness and concentricity of all work produced.

*General milling, vertical and horizontal.*—Where any general milling work is required either by slab or fly cutter, and/or shell mill, cutting off or slitting, the same can be handled efficiently by using a work table in conjunction with the tool head and the securing of material by clamp, vise or rotary table; the capacity of material to be handled being limited only by the size of lathe machine which is built accordingly to the swing of lathe to which it is being adapted.

From the foregoing description taken in connection with the accompanying drawings, it will be manifest that a lathe machine is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new is:

1. A universal milling attachment, for a lathe having a saddle, head stock spindle and motor, comprising a tool head column mounted on the lathe saddle; horizontal and cross feeds for adjusting the position of said column; a vertically adjustable tool head slide mounted laterally on said column; an arbor in said tool head slide; a tool head motor slung beneath said column; driving connections between said tool head motor and said arbor; a change-gear gear train driven also by said tool head motor; and a drive coupling connecting said gear train with the head stock spindle of said lathe to synchronize said head stock spindle and said tool head arbor speeds.

2. A universal milling attachment for a lathe having a saddle, head stock, head stock plate and spindle and motor, comprising a tool head column mounted on the lathe saddle; horizontal and cross feeds for adjusting the position thereof; a vertically adjustable tool head slide mounted laterally on said column; an arbor in said tool head slide; a tool head motor slung beneath said column; driving connections between said tool head motor and said arbor; a change-gear gear train driven also by said tool head motor; a mounting plate fastened to the head stock of the lathe; a worm gear on the plate of the head stock spindle; a worm shaft engaging said worm gear; a housing in which said worm shaft is journalled, adjustable on said plate; a stub shaft also journalled in said housing at right angles to said worm shaft and connecting therewith by a pair of bevel gears; and a telescoping drive shaft between said change-gear gear train and said stub shaft and connecting to each with a universal joint whereby the speeds of the head stock spindle of the lathe and the tool head arbor may be synchronized.

3. For a lathe or like machine and combination with a power-driven tool head mounted thereon, said tool head having an arbor, an arbor support with a bore coaxial with said arbor, a pair of horizontal and laterally spaced parallel shafts on which said support is slidably adjustable, and a longitudinally spaced pair of swivel supports journalled on said tool head, coaxially with the arbor and rotatable through an angle of 180°, each supporting both of said shafts.

4. For a milling machine, lathe attachment or the like having a surmounting tool head with a tapered arbor; a longitudinally spaced pair of swivel supports journalled respectively on opposite sides of the tool head, coaxially with the tapered arbor and rotatable through an angle of 180°; a pair of horizontal, laterally spaced shafts longitudinally adjustable in said swivel supports; and an arbor support having divergent arms through which said spaced shafts pass, a bore coaxially aligned with the tapered arbor in said tool head, and its lower side flat and finished close up to said bore.

FREDERICK R. FRANCIS.

REFERENCES CITED

The following references are of record in the file of this patent:

UNITED STATES PATENTS

| Number | Name | Date |
|---|---|---|
| 359,375 | Ballou | Mar. 15, 1887 |
| 963,904 | Lang | July 12, 1910 |
| 1,144,744 | Wheeler | June 29, 1915 |
| 1,239,268 | Hammon | Sept. 4, 1917 |
| 1,263,671 | Hollopeter | Apr. 23, 1918 |
| 1,636,755 | Parsons | July 26, 1927 |
| 1,658,267 | Trecker | Feb. 7, 1928 |
| 1,706,587 | Parsons | Mar. 26, 1929 |
| 1,927,419 | Rupple | Sept. 19, 1933 |
| 1,963,033 | Rupple | June 12, 1934 |
| 2,034,221 | Armitage | Mar. 17, 1936 |
| 2,084,898 | Eckardt et al. | June 22, 1937 |
| 2,332,646 | Kelm | Oct. 26, 1943 |

FOREIGN PATENTS

| Number | Country | Date |
|---|---|---|
| 374,303 | Great Britain | June 9, 1932 |